Dec. 18, 1962 C. A. LONG 3,068,562
METHOD OF MAKING PRESSURE VESSELS
Filed April 15, 1960
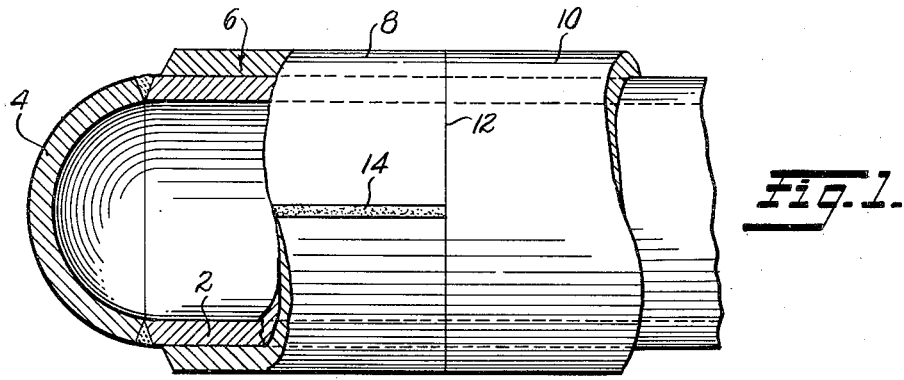
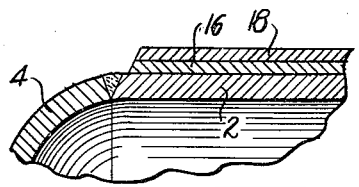
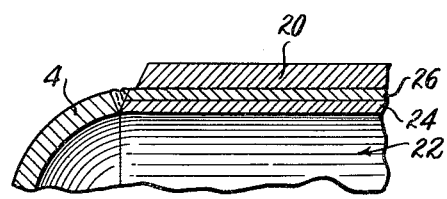
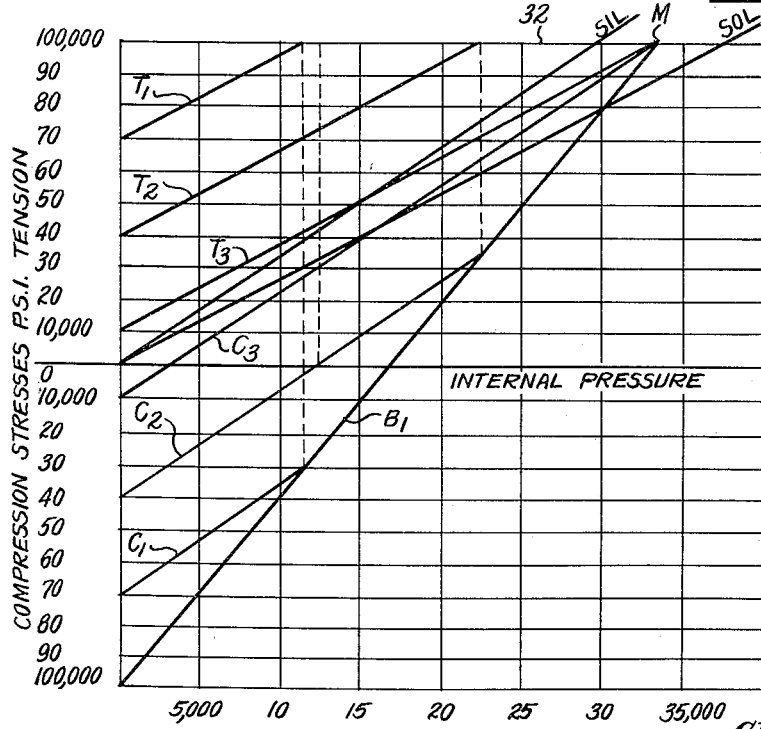
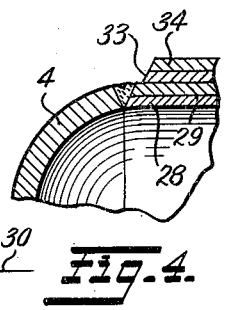
INVENTOR.
Charles A. Long
BY
Bacon & Thomas
ATTORNEYS

United States Patent Office 3,068,562
Patented Dec. 18, 1962

3,068,562
METHOD OF MAKING PRESSURE VESSELS
Charles A. Long, Titusville, Pa., assignor to Struthers Wells Corporation, Titusville, Pa., a corporation of Maryland
Filed Apr. 15, 1960, Ser. No. 22,516
9 Claims. (Cl. 29—421)

This invention relates to a method of making pressure vessels. While the description herein is directed specifically to closed containers, it is to be understood that the invention applies to other structures such as pipes, conduits, and the like. Hereinafter the term "pressure vessel" will be deemed to refer not only to closed containers, but also to pipes, conduits and similar structures.

There is increasing demand for pressure vessels capable of conducting or containing large volumes of gaseous and liquid materials under extremely high pressures. The pressures and quantities of material to be contained are in some instances so large that containers several feet in diameter are required and are required to have wall thicknesses, of high-strength steel, of the order of 4 to 6 inches or more. The handling and fabrication of such vessels presents many problems. It is, of course, important that the quantity of material employed be kept to a minimum since the materials are relatively costly and any method of fabrication which results in a substantial amount of waste unduly increases the cost of the product. It is also important that all of the material constituting the vessel be utilized to its fullest efficiency and that it all perform useful functions.

Obviously pressure vessels of the type referred to may also be constructed by starting with seamless tubing or pipe or large forgings with the required wall thickness and machining the same to accurate dimensions. Obviously, however, such a method is extremely costly in both material and labor, requires the use of highly specialized machinery and equipment, and is wasteful of material.

In initially unstressed vessels subject to internal pressure, the highest tangential stress is at the face of the inside wall and the lowest stress is at the outside wall surface, the drop in stress through the wall being equal to the internal pressure in the vessel. It is therefore true that as internal pressure increases, the difference between inner and outer face stresses increases proportionally with internal pressure. Thus in heavy wall vessels the metal in the outer wall portion is normally not being used economically or to its allowable strength value.

If such vessels are not to be constructed from a single piece of material they must necessarily be fabricated from separate pieces. There is very little equipment available for bending metal plates having a thickness of the order of 4 inches or more to the required shape and it therefore becomes apparent that vessels of the type referred to can more conveniently be constructed by making the circumferential walls thereof of several layers of material, which has been proposed heretofore.

One method of constructing such vessels is to first form the inner shell and machine to correct outside dimensions and to then form an outer shell to provide the required additional thickness and again machine the same to accurate inside dimensions so that it can be heated to expand circumferentially, slipped over the inner vessel, and allowed to cool whereby to shrink upon the inner vessel to prestress the layers to a controlled and predetermined amount. Obviously even this method is costly since it involves the very accurate machining of large heavy cylindrical parts and is further wasteful of expensive material.

A still further proposal has been to form an inner shell of relatively light sheet material without machining and then to wrap successive relatively thin sheets of metal therearound. Each layer is bent to the desired circumscribing shape and then slipped over the inner structure and heated and welded at its adjacent edges to form a longitudinal seam. When the outer layer cools and contracts, it shrinks upon the inner structure to form a tight assembly. However, most pressure vessels are preferably constructed according to the ASME Code for Unfired Pressure Vessels and in many instances are required to be so constructed. That code requires that all internal stresses be relieved and that all welded joints be perfect and of 100% efficiency and proved by X-ray examination. Otherwise, calculations of the thickness of material must be based on 80% of their actual strength. This is necessary to insure that the vessel be of the required strength even though it contains internal stresses and the welds may not be perfect.

In the last-described proposal for constructing such vessels, all layers of metal subsequent to the inner layer cannot possibly be X-rayed and thus the method requires the production of a vessel having a wall thickness in excess of that required if the material were utilized at 100% of its capabilities.

According to the present invention, vessels of the type referred to are constructed by first bending or otherwise forming a sheet of metal to the desired size and shape and then welding to form an inner shell. All welded joints are X-rayed, any defects found therein are cut out and re-welded, and the entire shell is stress-relieved by thermal means and thus a shell is produced in which the materials are used to 100% of their capabilities. One or more outer shells or sleeves are then separately fabricated, within normal shop tolerance limits so that the inner diameter of an outer shell is slightly less than the outer diameter of the next inner shell. A substantial variation in dimensions is permitted, it only being necessary that the outer shell be of such dimension that upon heating the same to a high temperature it expands sufficiently in a circumferential direction to be capable of being telescoped over the inner shell, either loosely or by press fit. Each successive shell, as fabricated, is likewise X-rayed, corrected if necesasry, and stress-relieved to render all joints 100% efficient. The outer shell, after being heated and telescoped over an inner shell, is allowed to cool whereupon it shrinks and stresses the inner shell in compression. Since the shells are fabricated within normal shop tolerance limits, the amount of shrinkage stress developed upon cooling is indeterminate and may in many instances be highly excessive. In all cases, however, the cool structure will be tight, the outer shell not being loose on the inner.

According to the present invention the vessel is then sealed and subjected to high internal fluid pressure which is increased sufficiently to stress at least the outer shell to and beyond the yield point of its material. When the outer shell or shells reaches its yield point, further increase of internal pressure in the vessel results in mere circumferential elongation of the outer shell or shells and the inner shell or shells must then carry all the additional load. The internal pressure is increased to the point where the innermost shell approaches or just reaches its yield point, at which time no further internal pressure is applied. There after the internal pressure in the vessel is gradually reduced to zero and all the shells elastically return to a state of equilibrium with the innermost stressed in compression and the outermost stressed in tension. It has been found that the stresses in the shells after the treatment described above always return to the same value, irrespective of the degree of shrink fit initially provided. The stresses in the materials are within uniform permissible limits and result in a vessel having a greater factor of safety than that for which it was originally designed. The stretching or circumferential elongation of the outer shell, while being of sufficient magnitude to achieve the desired results, is not enough to make any significant change in the designed dimensions of the vessel.

While the above described method is especially advantageous in forming vessels having the thick walls referred to, it is to be understood that the same advantages accrue, and the process may be used, in making vessels having thinner walls.

It is therefore an object of this invention to provide a method of making pressure vessels, which method is suitable for normal shop techniques and for practice within normal shop tolerance limits and yet provides uniform and predictable final results.

Another object of the invention is to provide a method for making pressure vessels resulting in a maximum economy of material and labor.

Still another object of the invention is to provide a method of making pressure vessels resulting in substantially 100% efficiency of use of the materials employed.

A further object of the invention is to provide a method for treating telescopically-related shells to reduce any excessive shrink fit therebetween to a predetermined value.

Still further and additional objects will become apparent to those skilled in the art as the description proceeds with reference to the accompanying drawings, wherein:

FIG. 1 is a fragmentary view of a pressure vessel constructed in accordance with the present invention and with parts thereof broken away;

FIGS. 2, 3 and 4 are fragmentary sectional views illustrating portions of modified forms of vessel constructed in accordance with this invention; and FIG. 5 is a graph illustrating the stress relationships between the various layers of a vessel before, during, and after practice of the method herein described.

FIG. 1 illustrates merely one example of a pressure vessel constructed in accordance with this invention. As shown, the vessel comprises an inner cylindrical shell portion 2, which may comprise a plurality of axially aligned sections welded to each other, and an end closure 4 likewise welded to the shell 2. In vessels of this type it is well known that internal pressure stresses the material comprising the walls of the vessel. That stress resolves itself into a longitudinal component and a circumferential component. Calculations show that the longitudinal component is one-half the circumferential component and thus the hemispherical end closure 4 need be only one-half as thick as the circumferential walls of the vessel. For this reason the inner shell 2 and the head 4 are formed of material of the same thickness. The shell 2 is capable of withstanding all longitudinal tension developed but is also about one-half the thickness required to withstand the circumferential stress. To provide the requisite strength to resist circumferential stress or as is known in the trade, to provide "hoop" strength, an outer shell structure 6 is provided. The outer shell 6 may consist of any number of bands or sleeves 8 and 10 which need not be welded at their end edges 12 since it is not necessary for them to withstand any longitudinal stress.

In pressure vessels of the type under discussion wherein extremely thick walls are necessary, it would be impractical and costly to form the entire circumferential wall of a single sheet of metal since the difficulties encountered in bending and forming such heavy sheets are enormous. Furthermore, it is not necessary that the end closure or cap 4 be of the same thickness as the circumferential walls and it too would be difficult to fabricate from a sheet of the full thickness required for the side walls. As shown, the inner shell 2 is of much less thickness than the total wall thickness and is more easily handled and fabricated, as is the end head cap 4. The inner shell 2 and end cap 4 are formed and held to the required dimensions only within the normal shop tolerance limits without machining or otherwise forming the same to precise dimensions. After forming, the shell 2 is inspected by X-raying all welded joints, cutting out any defects found therein and rewelding the same, then again X-raying until all welded joints are shown to be 100% perfect and therefore of a strength equal to the material joined thereby. After all joints are known to be perfect, the entire inner shell is stress-relieved, usually by heating to an elevated temperature and allowing the same to cool gradually. This is a process well known in the art and is sometimes referred to as "stress-relieving." The outer circumference of the shell 2 is then measured to a reasonable degree of accuracy and sheets for forming the outer shell 6 are cut to proper dimension so that the cylinders formed thereby are of somewhat less internal circumference than the measured external circumference of the shell 2. The sheets are rolled to the cylindrical form shown and welded at their adjacent edges to form the longitudinal seams indicated at 14. Thereafter each shell or sleeve 8 and 10 is inspected by X-rays and corrected if necessary so that the seams 14 are perfect. Thereafter each outer shell is stress-relieved.

The outer shells 8 and 10 are then heated to a high temperature to cause them to expand in a circumferential direction sufficiently so that they may be telescopically slipped over the inner shell 2. It does not matter whether they slide over the inner shell 2 freely or whether it is necessary to force them into position. Irrespective of the ease with which the outer shells 8 and 10 are applied over the inner shell 2, the structure is then cooled and the outer shells permitted to shrink on to the inner shell 2. This shrinkage produces what is known as an interference fit and tends to compress the inner shell while placing the outer shells in circumferential tension. In some instances the stresses thus introduced may be very slight, whereas in other instances they may be excessive and even of such magnitude as to stress the materials to their yield point.

Obviously a vessel at this stage of production is not satisfactory or reliable for its intended use. After forming the vessel in the manner thus far described, the same is sealed and fluid pressure, preferably oil or water, is applied to the inside of the vessel and slowly increased. The pressure inside the vessel thus tends to reduce compression and/or increase tension in a circumferential direction in the wall structure of the vessel. By knowing the thickness of the walls and the dimensions of the vessel, the stress induced in the walls of the vessel by the internal pressure can be precalculated and known within very close limits. The internal pressure is increased and thus tends to decrease the compression in the inner shell and increase the tension in the outer shell. Those stresses are increased by internal pressure until the outer shell reaches the yield point of its material. A further increase in internal pressure results in a circumferential stretching or elongation of the outer shell without its carrying any additional load. The tensile stress in the inner shell thus increases more rapidly, since it is now carrying the entire increase in load and the internal pressure is built up to a point where the material of the inner shell is stressed substantially to its yield point. When that condition is reached the outer shell has been stretched in an amount dependent upon the magnitude of the initial shrink fit and it is conceivable that adjacent sleeves 8 and 10 might reach that point at different times but at cessation of application of internal pressure the entire inner shell is stressed substantially to its yield point and all of the outer shell sleeves 8 and 10 have been permanently stretched and the materials thereof are all stressed by the same amount. When that point is reached internal pressure is gradually reduced to zero, thus permitting both the inner and outer shells to elastically return to a condition of equilibrium with the inner shell under compression and the outer shell in tension, the stresses in the materials are not excessive and are predictable and uniform in results.

The foregoing description with reference to FIG. 1 describes the method of forming a pressure vessel wherein the circumferential wall consists of two layers of approximately equal thickness. However, in some instances it may be desirable to fabricate an equivalent vessel with at least some material being of lesser thickness than one-half that of the circumferential wall. FIG. 2 illustrates a modified form of vessel wherein the inner shell 2 and end cap 4 are approximately one-half the total required thickness of the circumferential wall. The outer shell, however, consists of a plurality of layers 16 and 18 each of which is of about one-half the thickness of the inner shell 2. In many instances and in certain shops it may be found more practical and/or economical to resort to the construction exemplified by FIG. 2.

FIG. 3 likewise shows a modified form of vessel wherein the end cap 4 is welded to an inner shell 22 consisting of a plurality of layers or shells 24 and 26 and the outer shell 20 is of one thickness. Other arrangements and proportions will be obvious to those skilled in the art and may be dictated by the available materials and/or equipment for rolling the sheets to the desired form. For example, FIG. 4 shows a further modified form of vessel wherein the end cap 4 is welded to an inner shell consisting of a plurality of layers or shells 28 and 29 and the outside shell consists of a plurality of layers or shells 33 and 34.

FIG. 5 is a graph illustrating the changes in stress in the materials of inner and outer shells of a 2-layer vessel during various stages in the practice of the present method. It is to be understood, however, that the same analysis and same changes occur whether the vessel is fabricated of two or more layers. The horizontal center line 30 of FIG. 5 represents the zero metal stress line, whereas vertical lines of the chart represent different values of internal fluid pressure applied to the vessel during the practice of the invention. The horizontal lines below line 30 represent compressive stresses in pounds per square inch, whereas those values above line 30 represent tensile stresses in pounds per square inch in the shell layers.

In preparing a graph like that of FIG. 5 for computation of the values in the practice of this method, the wall thickness of the required vessel is first calculated as though it were a solid one-piece wall, using the applicable ASME Code formula with the allowable design stress and allowed weld joint efficiency for the particular material and conditions encountered. The calculations give the thickness of a solid wall for an internal working pressure of 15,000 p.s.i. In the present case the weld joint efficiency is 100% and two equal thickness layers are shown. The values of stress are calculated and plotted for the different unit internal pressures indicated along the bottom of the chart. Without any shrink fit stresses the internal pressure only would cause stresses in the inside layer as shown by line SIL and would cause stress in the outside layer as shown by line SOL. Any shrink fit stress is algebraically additive to internal pressure stress. Thus lines T1 or T2 start at the shrink tensile stress obtained in fabrication and increase parallel to line SOL by internal pressure, and lines C1 or C2 start at the shrink compressive stress obtained in fabrication and increase parallel to line SIL by internal pressure. Those values below line 30 represent the compressive stresses of the inside layer of the wall, whereas those values above line 30 represent tensile stresses of the outer layer of the wall. For those portions of the wall which are initially under tension, the unit stress will vary according to a straight line as exemplified by any of lines T1 or T2, depending upon the shrink fit obtained in fabrication. It is to be noted that the lines T1 and T2 are parallel to each other and to line SOL. The portions of the wall which are initially under compression vary in stress according to the straight lines C1 and C2, which are likewise parallel to each other and to line SIL but which slope differently from the lines T1, T2 and SOL, the slope being somewhat steeper.

Assume that a vessel like that of FIG. 1 has been assembled and cooled so that the outer shells 8 and 10 have shrunk onto the inner shell to such a degree that the stresses in the inner and outer shells are respectively 40,000 lbs. per sq. in. in compression, and 40,000 lbs. per sq. in. in tension, as represented by the lowermost ends of lines C2 and T2. It is to be remembered that, at this stage of fabrication, there is no internal pressure in the vessel. The values of stress thus present in the material are excessive and would cause the outer layer exceeding the permissible stress when internal pressure reaches its designed value of 15,000 p.s.i. Internal pressure is then applied to the vessel and the stresses in the outer shell increase along the line T2, whereas the stresses in the inner shell follow the line C2. As illustrated, the stress in the outer shell reaches approximately 73,000 lbs. per sq. in. at an internal unit pressure of about 12,500 lbs. per sq. in. within the vessel and at that point the inner shell is at substantially zero stress. As internal pressure is increased the stress in the outer shell reaches a value of 100,000 lbs. per sq. in. (which is the yield point of the material being used), at an internal pressure value of about 22,500 lbs. per sq. in. A further increase in the value of internal pressure results in mere circumferential elongation of the outer shell without any increase in the stress therein so that the stress in the outer shell is represented by the line 32. While the outer shell is being elongated, the inner shell must assume the entire increase in stress due to the increase in internal pressure and its stress varies with internal pressure along the line B1 which is much steeper than C2. The line B1 is the stress line with the inner shell alone carrying the increase in internal pressure after the outer layer or layers have reached the yield point and elongate only without carrying additional pressure. The B1 line slope so determined can be extended downward and may begin at points other than at the 100,000 compressive yield point shown for this example. As internal pressure is further increased, lines B1 and 32 converge and the stresses in the inner and outer shells approach a common value of 100,000 lbs. per sq. in. at point M wherein the internal fluid pressure is approximately 33,300 p.s.i. It is contemplated that the increase in internal pressure be stopped at this point and thereafter relieved and gradually reduced to zero value. The 100,000 p.s.i. stress in the outer layer is now decreased by the amount of stress caused by internal pressure and follows downwardly along the line T3 which is parallel to T1, T2 and SOL. The 100,000 p.s.i. stress in the inner shell is likewise decreased by the amount of stress caused by internal pressure and follows downwardly along line C3 which is parallel to C1, C2 and SIL. When internal pressure is reduced to zero it is found that the tension in the outer shell is 10,000 p.s.i. and there is compression in the inner shell of 10,000 p.s.i. It is to be remembered that the line C3 is not parallel to T3.

It will be obvious that it is immaterial what the initial stresses were in the inner and outer shells (which in this case were assumed to be 40,000 p.s.i.) at the beginning of the internal pressure since the practice of the process herein described results in the stress lines meeting at the same point M and then following down T3 and C3 to the same final values. The point M is determined by the physical characteristics of the material and in the particular example described the pressure is 33,300 p.s.i. inside the vessel. Line B1 always shows stress for internal pressure when all the final internal pressure is carried by the inner layer alone, since all outer layers have reached their yield load carrying ability and can carry no more internal pressure.

After completion of the process as described above and when the vessel is in use, any internal pressure therein causes the stresses in the inner and outer shells to move along the lines C3 and T3, respectively, and to again always return to the starting values of 10,000 p.s.i. tension and compression since the vessel is designed to operate within the intended pressures with the materials thereof remaining within their elastic limits. As is apparent from the graph of FIG. 5, which was based upon a maximum desired working pressure of 15,000 lbs. per sq. in. inside the vessel, the material does not reach its yield point until the internal pressure reaches the value of 33,300 lbs. per sq. in. Assume the design requires a safety factor of 2 from the yield point by ASME Code formula, a vessel of this design having the same dimensions as a monoblock wall vessel for that intended working pressure actually has a factor of safety of 2.22.

While the description herein is limited to a small number of examples, it is to be understood that the pressure vessel may have features other than those described, all within the scope of this invention. For example, the inner plate may be a clad plate to provide corrosion resistance, the shell may also comprise more than the illustrated number of layers and may be built up to any wall thickness desired, it being intended, however, that each layer be as thick as can practicably be handled and formed with the ordinary shop equipment and within the usual shop tolerance limits.

I claim:

1. The method of reducing excess shrink interference between a plurality of layers of metal defining a circumferential wall of a pressure vessel, comprising the steps of: applying fluid pressure to the inner face of said wall sufficient to stress at least the outermost layer to its yield point, increasing said fluid pressure to permanently circumferentially elongate at least said outer layer and to tensionally stress the innermost layer to a value approaching but not exceeding its yield point, and then removing said fluid pressure whereby said wall layers elastically return to a state of equilibrium with said outer layer non-excessively stressed in tension and said inner layer non-excessively stressed in compression.

2. The method of claim 1 wherein said fluid pressure is increased sufficiently to tensionally stress said inner layer substantially to its yield point.

3. The method of making a pressure vessel having a circumferential wall composed of a plurality of layers of metal, comprising the steps of: separately forming at least two substantially cylindrical shells, the inner diameter of one being less than the outer diameter of the other; heating said one shell to circumferentially expand the same; placing the one shell over the other in circumscribing relation allowing said one shell to cool and shrink onto said other shell to stress the materials of said shells in an undetermined amount; applying fluid pressure to the inner face of said wall sufficient to stress at least the outermost layer to its yield point, increasing said fluid pressure to permanently circumferentially elongate at least said outer layer and to tensionally stress the innermost layer to a value approaching but not exceeding its yield point, and then removing said fluid pressure whereby said wall layers elastically return to a state of equilibrium with said outer layer non-excessively stressed in tension and said inner layer non-excessively stressed in compression.

4. The method defined in claim 3 wherein said shells are formed without accurate control of dimensions or smoothness of surfaces but only within practical shop tolerance limits.

5. The method defined in claim 3 wherein each of said shells is separately formed from a sheet metal plate by curving the same to the desired shape; welding adjacent edges thereof to form a longitudinal seam; and thermally stress-relieving said shell.

6. The method defined in claim 3 wherein each of said shells is separately formed from a sheet metal plate by curving the same to the desired shape; welding adjacent edges thereof to form a longitudinal seam; and subjecting the welded seam to non-destructive tests to assure 100% efficiency of the welded longitudinal seam.

7. The method defined in claim 3 wherein each of said shells is separately formed from a sheet metal plate by curving the same to the desired shape; welding adjacent edges thereof to form a longitudinal seam; X-raying said seam and correcting any defects therein to produce a welded seam of 100% efficiency; and then thermally stress-relieving said seam.

8. The method defined in claim 3 wherein said wall is formed of more than two of said shells by successively shrinking said shells onto said wall before applying said fluid pressure and wherein said fluid pressure is increased to stress all shells except said inner shell to and beyond their yield points.

9. The method of making a pressure vessel having a circumferential wall composed of a plurality of layers of metal and including an inner cylindrical shell and an outer shell of separate axially adjacent bands extending circumferentially about said inner shell, comprising the steps of: separately forming an inner shell and a plurality of outer bands, the inner diameter of said bands being less than the outer diameter of said inner shell; heating said outer bands to circumferentially expand the same; placing said bands over said shell in circumscribing relation thereto and allowing said bands to cool and shrink onto said shell to stress the materials of said shell and bands in respectively undetermined amounts; applying fluid pressure to the inner face of said wall sufficient to stress all of said bands to their yield point, increasing said fluid pressure to permanently circumferentially elongate at least said outer bands and to tensionally stress the inner shell to a value substantially to its yield point, and then removing said fluid pressure whereby said wall layers elastically return to a state of equilibrium with said outer bands non-excessively stressed in tension and said inner layer non-excessively stressed in compression.

References Cited in the file of this patent
UNITED STATES PATENTS

| | | |
|---|---|---|
| 44,434 | Mothe | Sept. 27, 1864 |
| 1,346,535 | Fedden | July 13, 1920 |
| 1,820,069 | Herr | Aug. 25, 1931 |
| 2,337,247 | Kepler | Dec. 21, 1943 |
| 2,480,369 | Jasper | Aug. 30, 1949 |